(12) United States Patent
Amano et al.

(10) Patent No.: US 11,815,177 B2
(45) Date of Patent: Nov. 14, 2023

(54) DIAGNOSTIC DEVICE AND CONTROL DEVICE FOR AUTOMATIC TRANSMISSION

(71) Applicants: JATCO Ltd, Fuji (JP); NISSAN MOTOR CO., LTD., Yokohama (JP)

(72) Inventors: Norihira Amano, Fuji (JP); Masahiro Hamano, Atsugi (JP)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 31 days.

(21) Appl. No.: 17/624,638

(22) PCT Filed: Jun. 29, 2020

(86) PCT No.: PCT/JP2020/025450
§ 371 (c)(1),
(2) Date: Jan. 4, 2022

(87) PCT Pub. No.: WO2021/006086
PCT Pub. Date: Jan. 14, 2021

(65) Prior Publication Data
US 2022/0243808 A1   Aug. 4, 2022

(30) Foreign Application Priority Data
Jul. 8, 2019   (JP) ................................. 2019-126768

(51) Int. Cl.
*F16H 61/12*   (2010.01)
*F16H 59/42*   (2006.01)
(Continued)

(52) U.S. Cl.
CPC ............. *F16H 61/12* (2013.01); *F16H 59/42* (2013.01); *F16H 59/44* (2013.01); *F16H 59/70* (2013.01);
(Continued)

(58) Field of Classification Search
CPC .......... F16H 59/42; F16H 59/44; F16H 59/70; F16H 2059/6823; F16H 2059/706;
(Continued)

(56) References Cited

U.S. PATENT DOCUMENTS

2002/0198647 A1    12/2002  Kawamoto et al.
2007/0213164 A1*    9/2007  Tasaka .................... F16H 61/12
                                                          475/119
2007/0298932 A1*   12/2007  Yoneyama .............. F16H 61/12
                                                          477/120

FOREIGN PATENT DOCUMENTS

JP       2002-323122 A     11/2002

* cited by examiner

*Primary Examiner* — Edwin A Young
(74) *Attorney, Agent, or Firm* — Foley & Lardner LLP

(57) ABSTRACT

The transmission controller is configured to, when the received range position signal indicates that the range position is switched from a travelling range to a neutral range during travelling, output an instruction to disengage all of friction elements that are in an engaged state in the travelling range, output an instruction to at least one friction element before the instruction to disengage all of the friction elements that are in the engaged state in the travelling range is output, confirm a change in a rotation speed of a transmission input shaft after the instruction to disengage is output to the at least one friction element, and when there is no change in the rotation speed, diagnose that the friction element instructed to be disengaged is in an erroneously engaged state in which the friction element is not able to be disengaged.

9 Claims, 7 Drawing Sheets

(51) Int. Cl.
*F16H 59/44* (2006.01)
*F16H 59/70* (2006.01)
*F16H 61/32* (2006.01)
F16H 59/68 (2006.01)
F16H 61/28 (2006.01)

(52) U.S. Cl.
CPC ..... *F16H 61/32* (2013.01); *F16H 2059/6823* (2013.01); *F16H 2059/706* (2013.01); *F16H 2061/124* (2013.01); *F16H 2061/1216* (2013.01); *F16H 2061/1276* (2013.01); *F16H 2061/2853* (2013.01)

(58) Field of Classification Search
CPC .. F16H 61/12; F16H 61/32; F16H 2061/1216; F16H 2061/124; F16H 2061/1276; F16H 2061/2853
See application file for complete search history.

ENGAGEMENT TABLE

| NUMBER OF GEAR POSITIONS | B1 | B2 | B3 | K1 | K2 | K3 |
|---|---|---|---|---|---|---|
| 1 | | ● | ● | | | ● |
| 2 | | ● | ● | | ● | ● |
| 3 | | ● | ● | | ● | |
| 4 | | ● | ● | ● | | |
| 5 | | | ● | ● | ● | |
| 6 | | | ● | ● | | ● |
| 7 | | | ● | ● | | ● |
| 8 | ● | | | ● | | ● |
| 9 | ● | | ● | ● | | |
| Rev | ● | ● | ● | | | |
| N RANGE, P RANGE | | | | | | |

DIAGNOSTIC DEVICE AND CONTROL DEVICE FOR AUTOMATIC TRANSMISSION

TECHNICAL FIELD

The present invention relates to a diagnostic device and a control device for an automatic transmission to be mounted on a vehicle.

BACKGROUND ART

As a background art, a hydraulic control device for an automatic transmission as follow is disclosed (see Patent Literature 1). When a manual valve is switched by a D→N operation such that a D range port and a drain port communicate with each other, a pressure oil of an input clutch hydraulic servo is discharged through an orifice in which a flow area is set small and a check valve. Remaining pressure oil communicates with an output port of a control valve through a port of a relay valve, and the control valve is controlled by a control pressure of a linear solenoid valve controlled by a command value based on a discharge pattern corresponding to an oil temperature, and the remaining pressure oil is discharged through an input port. When an oil temperature decreases to a temperature equal to or lower than a predetermined value, the relay valve is switched to a left half position and the pressure oil of the hydraulic servo is quickly drained through the port.

The device disclosed in Patent Literature 1 includes a manual valve, and a forward movement and a reverse movement are guaranteed in terms of hardware. However, in a case of a hydraulic control circuit which does not include a manual valve, the forward movement and the reverse movement are not guaranteed in terms of hardware, and when a D→N select operation is performed during travelling, all elements are brought into a disengaged state, and two elements may be engaged (one element may be disengaged from a D range state) after a vehicle speed decreases. When there is a clutch or a brake in an erroneously engaged state in which the elements cannot be disengaged in the all elements disengaged state, three elements including the friction element in the erroneously engaged state may be in an engaged state when two elements are engaged in an N range state, and a gear ratio may be established. There is a problem that when the gear ratio is established, even though a driver recognizes the N range state, a deceleration caused by an engine brake or the like occurs and the driver may feel uncomfortable.

CITATION LIST

Patent Literature

Patent Literature 1: JP2002-323122A

SUMMARY OF INVENTION

The invention is made in view of the above-mentioned problem, and an object of the invention is to prevent an uncomfortable feeling caused by erroneous engagement of the disengagement element from being given to a driver when a select operation to a neutral range is performed during travelling.

According to an aspect of the present invention, a diagnostic device for an automatic transmission to be used in a stepped automatic transmission having gear positions, includes a range position determinator configured to determine a range position based on a select operation of a driver; a shift solenoid configured to control engagement/disengagement of each of a plurality of friction elements of a gear train; and a transmission controller configured to receive a range position signal transmitted from the range position determinator and output a control instruction to the shift solenoid.

The transmission controller is further configured to output an engagement instruction/a disengagement instruction to a friction element based on the received range position signal during a select operation, when the received range position signal indicates that the range position is switched from a travelling range to a neutral range during travelling, output a disengagement instruction to all of friction elements that are in an engaged state in the travelling range, output the disengagement instruction to at least one friction element before the disengagement instruction is output to all of the friction elements that are in the engaged state in the travelling range, confirm a change in a rotation speed of a transmission input shaft after the disengagement instruction is output to the at least one friction element, and when there is no change in the rotation speed, diagnose that any of the friction elements instructed to be disengaged is in an erroneously engaged state in which the friction element is not able to be disengaged.

According to another aspect of the present invention, a diagnostic device for an automatic transmission to be used in a stepped automatic transmission having gear positions, includes a range position determinator configured to determine a range position based on a select operation of a driver; a shift solenoid configured to control engagement/disengagement of each of a plurality of friction elements of a gear train; and a transmission controller configured to receive a range position signal transmitted from the range position determinator and output a control instruction to the shift solenoid.

The transmission controller is further configured to: output an engagement instruction/a disengagement instruction to a friction element based on the received range position signal during a select operation, when the received range position signal indicates that the range position is switched from a travelling range to a neutral range during travelling, output the disengagement instruction to all of friction elements that are in an engaged state in the travelling range, and then, when a vehicle speed decreases to a value lower than a predetermined vehicle speed, output the disengagement instruction to at least one friction element among a plurality of friction elements to be engaged when a predetermined gear position is to be shifted to and output the engagement instruction to the remaining friction elements, while the disengagement instruction is output to the at least one friction element and after the engagement instruction is output to the remaining friction elements, confirm the change in the rotation speed of the transmission input shaft, and when there is a change in the rotation speed, diagnose that any of the friction elements instructed to be disengaged is in the erroneously engaged state in which the friction element is not able to be disengaged.

DESCRIPTION OF EMBODIMENTS

Figure 1:
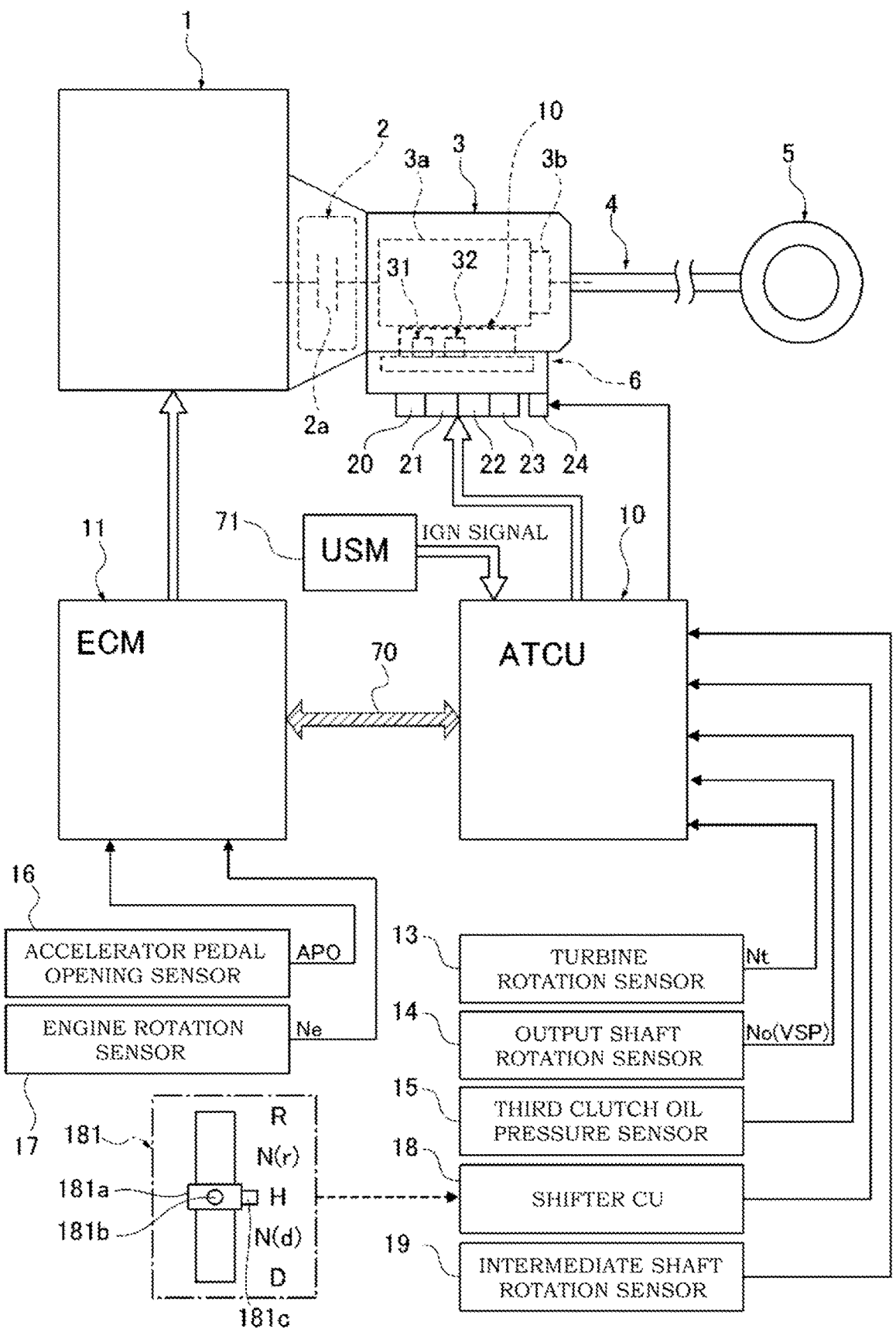
FIG. 1 is an overall system diagram showing an engine vehicle provided with an automatic transmission to which a diagnostic device of a first embodiment is applied.

Hereinafter, a mode for implementing a diagnostic device for an automatic transmission of the present invention will be described with reference to a first embodiment shown in the drawings.

First Embodiment

A diagnostic device of a first embodiment is applied to an engine vehicle (an example of a vehicle) provided with an automatic transmission achieved by shift-by-wire and park-by-wire and having gear positions of nine forward speeds and one reverse speed. Hereinafter, a configuration of the first embodiment will be described separately as "Overall System Configuration," "Detailed Configuration of Automatic Transmission," "Detailed Configuration of Hydraulic Control System," "Detailed Configuration of Electronic Control System," and "Configuration of Erroneous Engagement Diagnosis Process during Selection".

[Overall System Configuration (FIG. 1)]

As shown in FIG. 1, a driving system of the engine vehicle includes an engine 1, a torque converter 2, an automatic transmission 3, a propeller shaft 4, and a driving wheel 5. The torque converter 2 is provided with a built-in lock-up clutch 2a that directly connects a crankshaft of the engine 1 and an input shaft IN of the automatic transmission 3 by engagement. The automatic transmission 3 is provided with a built-in gear train 3a and a built-in park gear 3b. A control valve unit 6 including spool valves, a hydraulic control circuit, solenoid valves, and the like for shifting is attached to the automatic transmission 3.

The control valve unit 6 includes, as solenoid valves, six clutch solenoids 20 provided for each friction element, and one line pressure solenoid 21, one lubrication solenoid 22, and one lock-up solenoid 23. That is, a total of 9 solenoid valves are provided. Each of these solenoid valves has a three-way linear solenoid structure, and performs a pressure regulation operation in response to a control command from a transmission control unit 10.

As shown in FIG. 1, an electronic control system of the engine vehicle includes the transmission control unit 10 (abbreviated as "ATCU"), an engine control module 11 (abbreviated as "ECM"), and a CAN communication line 70. Here, the transmission control unit 10 is started or stopped according to an ignition signal from a sensor module unit 71 (abbreviated as "USM"). That is, the start or stop of the transmission control unit 10 is defined as a "wake-up or sleep control" in which a start variation increases as compared with a case of start or stop controlled by an ignition switch.

The transmission control unit 10 is mechanically and electrically integrally provided on an upper surface of the control valve unit 6, and includes a main board temperature sensor 31 and a sub board temperature sensor 32 on a unit board as a redundant system while ensuring independence between the board temperature sensors. That is, the main board temperature sensor 31 and the sub board temperature sensor 32 transmit sensor value information to the transmission control unit 10, but unlike well-known automatic transmission units, temperature information that is obtained not in direct contact with a transmission fluid (ATF) in an oil pan is transmitted. Signals from a turbine rotation sensor 13, an output shaft rotation sensor 14, and a third clutch oil pressure sensor 15 are also input to the transmission control unit 10. Further, signals from a shifter control unit 18, an intermediate shaft rotation sensor 19, and the like are also input to the transmission control unit 10.

The turbine rotation sensor 13 detects a turbine rotation speed (=transmission input shaft rotation speed) of the torque converter 2 and transmits a signal indicating a turbine rotation speed Nt to the transmission control unit 10. The output shaft rotation sensor 14 detects an output shaft rotation speed of the automatic transmission 3 and transmits a signal indicating an output shaft rotation speed No (=vehicle speed VSP) to the transmission control unit 10. The third clutch oil pressure sensor 15 detects a clutch oil pressure of a third clutch K3 and transmits a signal indicating a third clutch oil pressure PK3 to the transmission control unit 10.

The shifter control unit 18 determines a range position selected by a driver performing a select operation on a shifter 181, and transmits a range position signal to the transmission control unit 10. The shifter 181 has a momentary structure, and includes a P range button 181b on an upper portion of an operation unit 181a and a lock release button 181c (only when N→R) on a side portion of the operation unit 181a. Further, range positions include an H range (home range), an R range (reverse range), a D range (drive range), and N(d) and N(r) (neutral ranges). The intermediate shaft rotation sensor 19 detects a rotation speed of an intermediate shaft (an intermediate shaft=a rotation member connected to a first carrier C1), and transmits a signal indicating an intermediate shaft rotation speed Nint to the transmission control unit 10.

The transmission control unit 10 monitors changes in an operating point (VSP, APO), that is related to a vehicle speed VSP and an accelerator pedal opening APO, on a shift map (see FIG. 4), so as to perform shift control according to the following basic shift patterns:

1. Auto upshift (implemented by a vehicle speed increase in a state where an accelerator pedal opening is maintained)
2. Foot release upshift (implemented by an operation in which a foot leaves the accelerator pedal)
3. Foot ease upshift (implemented by an operation in which the accelerator pedal is eased up on)
4. Power-on downshift (implemented by a vehicle speed decrease while the accelerator pedal opening is maintained)
5. Small opening sudden press downshift (implemented by pressing an accelerator pedal by a small operation amount)
6. Large opening sudden press downshift (implemented by pressing an accelerator pedal by a large operation amount: "kickdown")
7. Slow press downshift (implemented by pressing an accelerator pedal slowly and a vehicle speed increase)
8. Coast downshift (implemented by a vehicle speed decrease in an accelerator pedal release operation).

Signals from an accelerator pedal opening sensor 16, an engine rotation sensor 17, and the like are input to the engine control module 11.

The accelerator pedal opening sensor 16 detects an accelerator pedal opening that is based on an accelerator operation of the driver, and transmits a signal indicating an accelerator pedal opening APO to the engine control module 11. The engine rotation sensor 17 detects a rotation speed of the engine 1 and transmits a signal indicating an engine rotation speed Ne to the engine control module 11.

In addition to various controls on the engine itself, the engine control module 11 performs an engine torque limitation control and the like by a cooperative control with the transmission control unit 10. Since the engine control module 11 is connected to the transmission control unit 10 via the CAN communication line 70 capable of bidirectionally exchanging information, when an information request from the transmission control unit 10 is received, information on the accelerator pedal opening APO and the engine rotation speed Ne is output to the transmission control unit 10. Further, information on an engine torque Te and a turbine torque Tt obtained by estimation calculation is output to the transmission control unit 10. In addition, when an engine torque limit request based on an upper limit torque from the transmission control unit 10 is received, an engine torque limit control, in which the engine torque is limited by a predetermined upper limit torque, is executed.

[Detailed Configuration of Automatic Transmission (FIGS. 2, 3, and 4)]

The gear train 3a of the automatic transmission 3 is characterized by the following points.

(a) A one-way clutch that mechanically engages and idles is not used as a shift element.
(b) Engagement/disengagement states of a first brake B1, a second brake B2, a third brake B3, a first clutch K1, a second clutch K2, and the third clutch K3, which are friction elements, are independently controlled by the clutch solenoid 20 at the time of shifting.
(c) The second clutch K2 and the third clutch K3 include centrifugal cancel chambers that offset a centrifugal pressure caused by a centrifugal force acting on a clutch piston oil chamber.

Figures 2, 3:
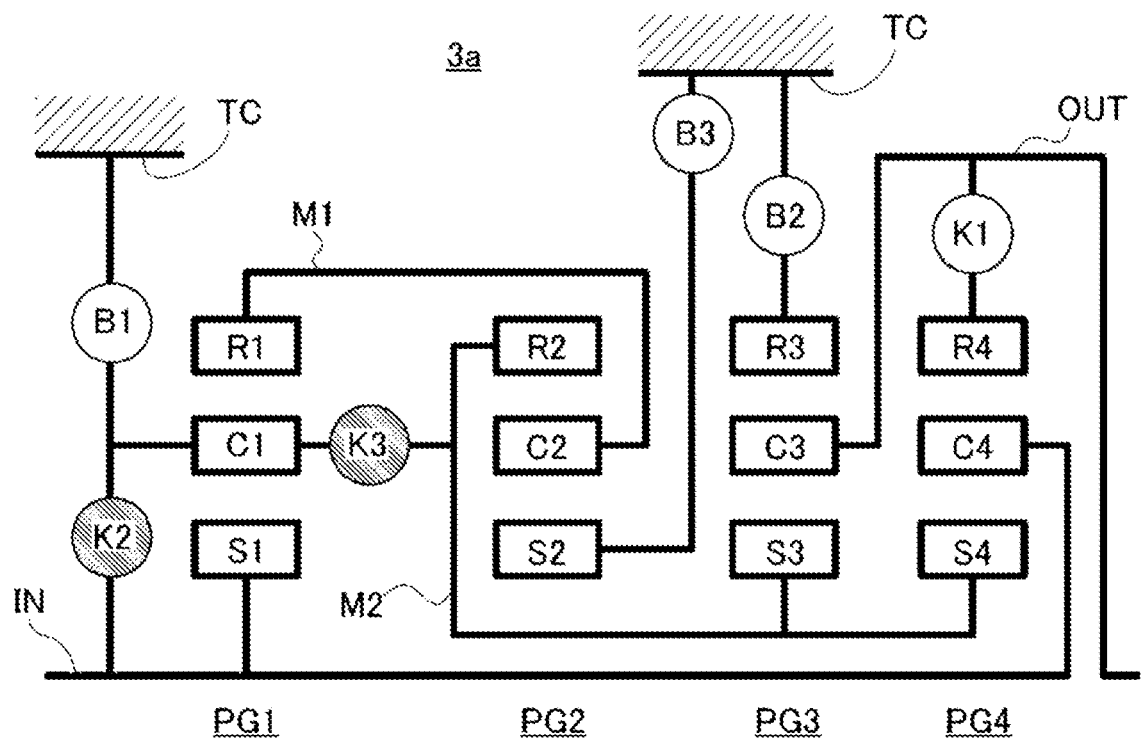
FIG. 2 is a skeleton diagram showing an example of a gear train of the automatic transmission.
FIG. 3 is an engagement table showing engaged states of shifting friction elements in the automatic transmission at each gear position.

As shown in FIG. 2, the automatic transmission 3 includes, as planetary gears constituting the gear train 3a, a first planetary gear PG1, a second planetary gear PG2, a third planetary gear PG3, and a fourth planetary gear PG4 in this order from the input shaft IN to an output shaft OUT.

The first planetary gear PG1 is a single pinion planetary gear, and includes a first sun gear S1, the first carrier C1 that supports pinions which mesh with the first sun gear S1, and a first ring gear R1 that meshes with the pinions.

The second planetary gear PG2 is a single pinion planetary gear, and includes a second sun gear S2, a second carrier C2 that supports pinions which mesh with the second sun gear S2, and a second ring gear R2 that meshes with the pinions.

The third planetary gear PG3 is a single pinion planetary gear, and includes a third sun gear S3, a third carrier C3 that supports pinions which mesh with the third sun gear S3, and a third ring gear R3 that meshes with the pinions.

The fourth planetary gear PG4 is a single pinion planetary gear, and includes a fourth sun gear S4, a fourth carrier C4 that supports pinions which mesh with the fourth sun gear S4, and a fourth ring gear R4 that meshes with the pinions.

As shown in FIG. 2, the automatic transmission 3 includes the input shaft IN, the output shaft OUT, a first connecting member M1, a second connecting member M2, and a transmission case TC. As friction elements that are engaged or disengaged by shifting, the first brake B1, the second brake B2, the third brake B3, the first clutch K1, the second clutch K2, and the third clutch K3 are provided.

The input shaft IN is a shaft in which a driving force from the engine 1 is input via the torque converter 2, and is normally connected to the first sun gear S1 and the fourth carrier C4. Further, the input shaft IN is detachably connected to the first carrier C1 via the second clutch K2.

The output shaft OUT is a shaft that outputs a shifted drive torque to the driving wheel 5 via the propeller shaft 4 and a final gear (not shown), and is connected to the third carrier C3 all the time. Further, the output shaft OUT is detachably connected to the fourth ring gear R4 via the first clutch K1.

The first connecting member M1 is a member that connects the first ring gear R1 of the first planetary gear PG1 and the second carrier C2 of the second planetary gear PG2 all the time with no friction element interposed therebetween. The second connecting member M2 is a member that connects the second ring gear R2 of the second planetary gear PG2, the third sun gear S3 of the third planetary gear PG3, and the fourth sun gear S4 of the fourth planetary gear PG4 all the time with no friction element interposed therebetween.

The first brake B1 is a friction element capable of locking rotation of the first carrier C1 with respect to the transmission case TC. The second brake B2 is a friction element capable of locking rotation of the third ring gear R3 with respect to the transmission case TC. The third brake B3 is a friction element capable of locking rotation of the second sun gear S2 with respect to the transmission case TC.

The first clutch K1 is a friction element that selectively connects the fourth ring gear R4 and the output shaft OUT. The second clutch K2 is a friction element that selectively connects the input shaft IN and the first carrier C1. The third clutch K3 is a friction element that selectively connects the first carrier C1 and the second connecting member M2.

A shift configuration in which each gear position is achieved will be described with reference to FIG. 3. A first-speed position (1st) is achieved by simultaneously engaging the second brake B2, the third brake B3, and the third clutch K3. A second speed position (2nd) is achieved by simultaneously engaging the second brake B2, the second clutch K2, and the third clutch K3. A third speed position (3rd) is achieved by simultaneously engaging the second brake B2, the third brake B3, and the second clutch K2. A fourth speed position (4th) is achieved by simultaneously engaging the second brake B2, the third brake B3, and the first clutch K1. A fifth speed position (5th) is achieved by simultaneously engaging the third brake B3, the first clutch K1, and the second clutch K2. The above-mentioned first to fifth speed positions are underdrive gear positions with a reduction gear ratio exceeding 1.

A sixth speed position (6th) is achieved by simultaneously engaging the first clutch K1, the second clutch K2, and the third clutch K3. This sixth speed position is a direct connection position with a gear ratio of 1.

A seventh speed position (7th) is achieved by simultaneously engaging the third brake B3, the first clutch K1, and the third clutch K3. An eighth speed position (8th) is achieved by simultaneously engaging the first brake B1, the first clutch K1, and the third clutch K3. A ninth speed position (9th) is achieved by simultaneously engaging the first brake B1, the third brake B3, and the first clutch K1. The above-mentioned seventh to ninth speed positions are overdrive gear positions with a speed increasing gear ratio of less than 1.

Further, when the gear position is upshifted or downshifted to an adjacent gear position among the gear positions of the first-speed position to the ninth speed position, as shown in FIG. 3, an interchange shift is performed. That is, shifting to the adjacent gear position is achieved by maintaining engagement of two friction elements among three friction elements, disengaging one friction element, and engaging another one friction element.

A reverse speed position (Rev) based on a selection of an R range position is achieved by simultaneously engaging the first brake B1, the second brake B2, and the third brake B3. When an N range position and a P range position are selected, basically all of six friction elements B1, B2, B3, K1, K2, and K3 are disengaged.

Figure 4:
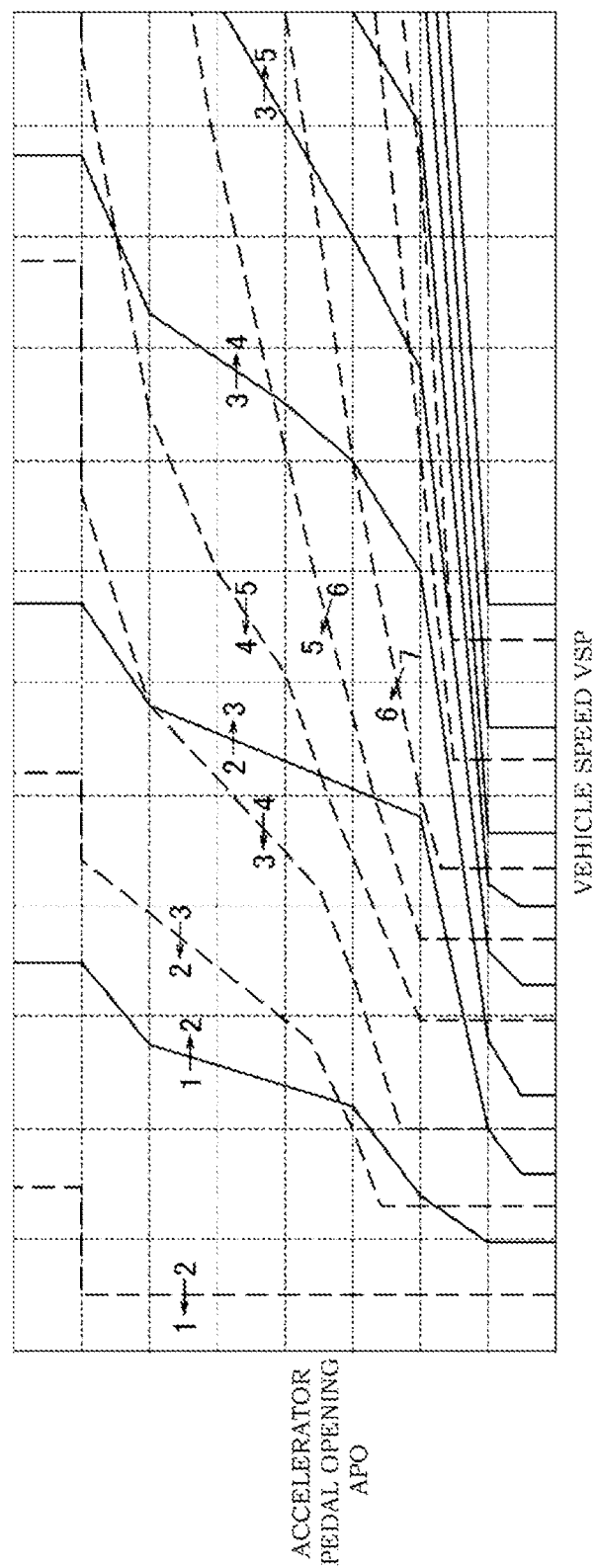
FIG. 4 is a shift map showing an example of a shift map in the automatic transmission.

Further, a shift map as shown in FIG. 4 is stored and set in the transmission control unit 10, and a shift by switching a gear position from the first speed position to the ninth speed position on a forward side by a selection of the D range is performed according to this shift map. That is, when the operating point (VSP, APO) at that time crosses an upshift line shown by a solid line in FIG. 4, an upshifting request is issued. In addition, when the operating point (VSP, APO) crosses a downshift line shown by a broken line in FIG. 4, a downshifting request is issued.

[Detailed Configuration of Hydraulic Control System (FIG. 5)]

Figure 5:
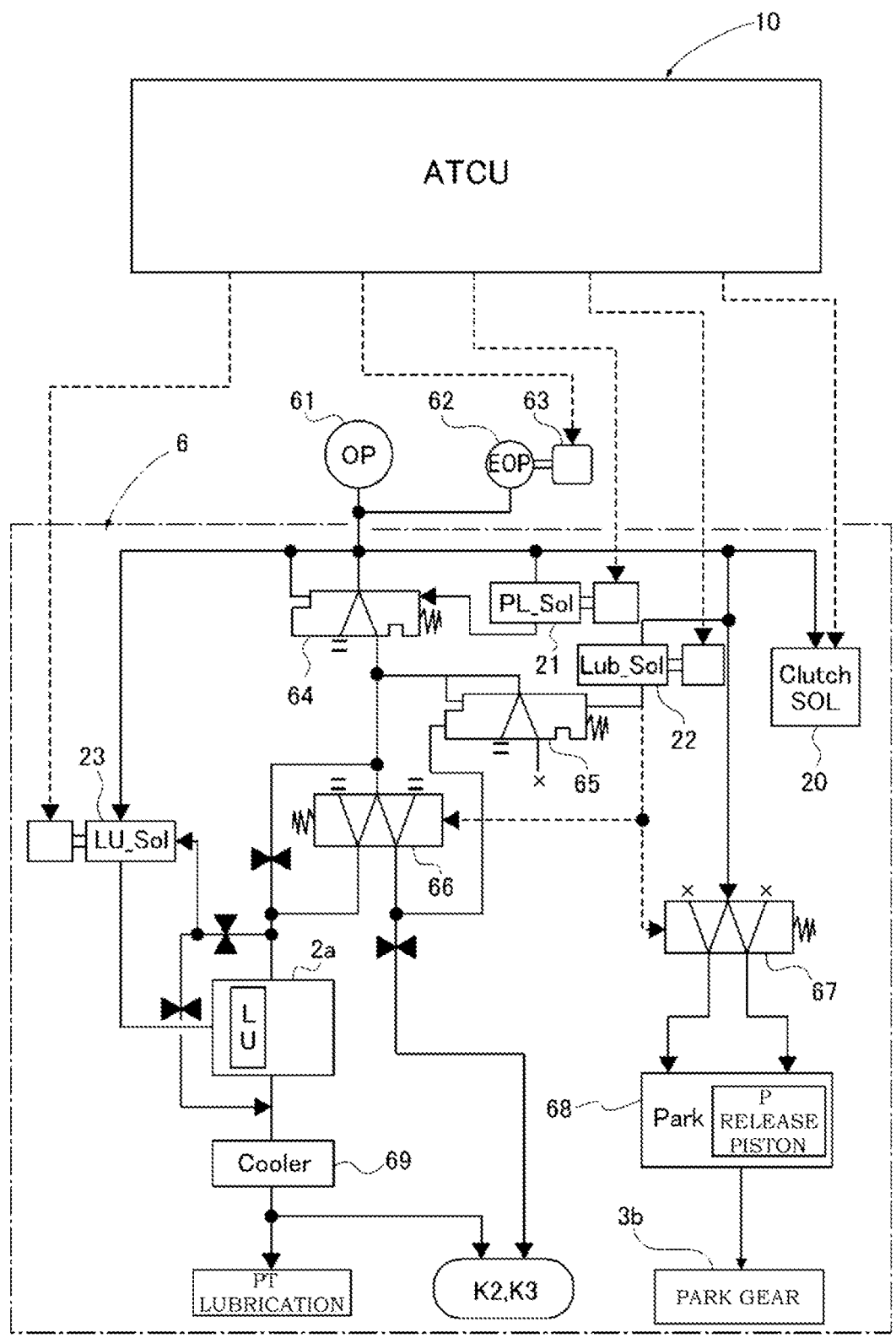
FIG. 5 is a hydraulic control system configuration diagram showing a control valve unit of the automatic transmission.

As shown in FIG. 5, the control valve unit 6 which is hydraulically controlled by the transmission control unit 10 includes, as hydraulic sources, a mechanical oil pump 61 and an electric oil pump 62. The mechanical oil pump 61 is pump-driven by the engine 1, and the electric oil pump 62 is pump-driven by an electric motor 63.

The control valve unit 6 includes, as valves provided in the hydraulic control circuit, the line pressure solenoid 21, a line pressure regulating valve 64, the clutch solenoid 20, and the lock-up solenoid 23. The control valve unit 6 also includes the lubrication solenoid 22, a lubrication pressure regulating valve 65, and a boost switching valve 66. The control valve unit 6 further includes a P-nP switching valve 67 and a park hydraulic actuator 68.

The line pressure regulating valve 64 regulates, according to a valve operation signal pressure from the line pressure solenoid 21, a pressure of an oil, that is discharged from at least one of the mechanical oil pump 61 and the electric oil pump 62, to a line pressure PL.

The clutch solenoid 20 is a shift solenoid that uses the line pressure PL as an initial pressure and controls an engagement pressure and a disengagement pressure for each of the friction elements (B1, B2, B3, K1, K2, K3). Although only one clutch solenoid 20 is illustrated in FIG. 5, six solenoids are provided for the friction elements (B1, B2, B3, K1, K2, K3).

The lock-up solenoid 23 controls a differential pressure of the lock-up clutch 2a by using excess oil at the time of adjusting the line pressure PL by the line pressure regulating valve 64.

The lubrication solenoid 22 has a function of generating a valve operation signal pressure to the lubrication pressure regulating valve 65 and a switching pressure to the boost switching valve 66, and adjusting a lubrication flow rate to be supplied to the friction elements to an appropriate flow rate for reducing heat generation. The lubrication solenoid 22 is also a solenoid that mechanically guarantees a minimum lubrication flow rate for reducing heat generation of the friction elements in a case other than a continuous shift protection, and adjusts a lubrication flow rate added to the minimum lubrication flow rate.

The lubrication pressure regulating valve 65 can control a lubrication flow rate, that is to be supplied to a power train (PT) including the friction elements and the gear train 3a via a cooler 69, according to the valve operation signal pressure from the lubrication solenoid 22. Further, the lubrication pressure regulating valve 65 reduces frictions by optimizing the lubrication flow rate supplied to the PT.

The boost switching valve 66 increases an amount of oil supplied to the centrifugal cancel chambers of the second clutch K2 and the third clutch K3 according to the switching pressure from the lubrication solenoid 22. This boost switching valve 66 is used to temporarily increase the amount of oil supplied in a scene where the amount of oil in the centrifugal cancel chambers is insufficient.

The P-nP switching valve 67 switches a line pressure path to the park hydraulic actuator 68 according to the switching pressure from the lubrication solenoid 22 (or a park solenoid). With the P-nP switching valve 67, a parking lock in which the park gear 3b is meshed when the P range is selected and a parking lock cancellation in which meshing of the park gear 3b is cancelled when the range is changed from the P range to a range other than the P range are performed.

In this way, the control valve unit 6 is configured to eliminate a manual valve which is mechanically connected to a shift lever to be operated by a driver and used for switching between a D-range pressure oil path, an R-range pressure oil path, a P-range pressure oil path, and the like. When the D range, the R range, and the N range are selected by the shifter 181, the "shift-by-wire" is implemented by adopting a control in which the six friction elements are independently engaged or disengaged based on the range position signal from the shifter control unit 18. Further, when the P range is selected by the shifter 181, the "park-by-wire" is implemented by operating, based on the range position signal from the shifter control unit 18, the P-nP switching valve 67 and the park hydraulic actuator 68 that constitute a park module.

[Detailed Configuration of Electronic Control System (FIG. 6)]

Figure 6:
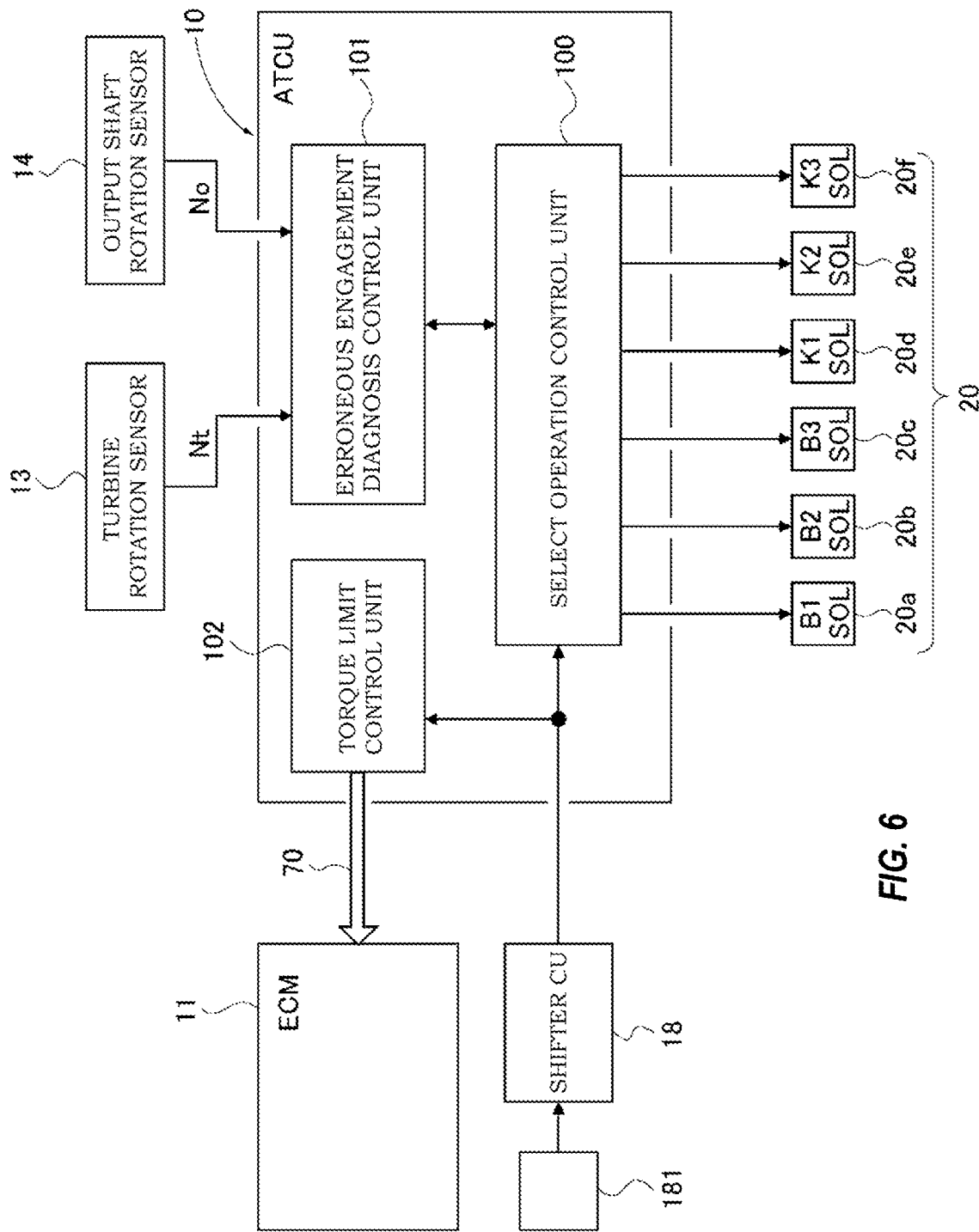
FIG. 6 is an electronic control system configuration diagram showing a transmission control unit and an engine control module of the automatic transmission.

As shown in FIG. 6, the configuration of the electronic control system, which performs an erroneous engagement diagnosis process of the automatic transmission 3 during a selection, includes the transmission control unit 10, the engine control module 11, the shifter control unit 18, the turbine rotation sensor 13, the output shaft rotation sensor 14, and the clutch solenoid 20.

The shifter control unit 18 is a range position determination unit that determines a range position based on a select operation of the driver to the shifter 181, and transmits a determined range position signal to the transmission control unit 10.

The clutch solenoid 20 is a shift solenoid that controls engagement/disengagement of each of the six friction elements B1, B2, B3, K1, K2, and K3 of the gear train 3*a* according to an engagement instruction/a disengagement instruction from the transmission control unit 10. The six clutch solenoids 20 are a first brake solenoid 20*a*, a second brake solenoid 20*b*, a third brake solenoid 20*c*, a first clutch solenoid 20*d*, a second clutch solenoid 20*e*, and a third clutch solenoid 20*f*.

The transmission control unit 10 includes a select operation control system that receives a range position signal transmitted from the shifter control unit 18 based on the range position select operation of the driver and outputs a control instruction to the clutch solenoid 20. The select operation control system includes a select operation control unit 100, an erroneous engagement diagnosis control unit 101, and a torque limit control unit 102.

The select operation control unit 100 outputs an engagement instruction/disengagement instruction to the friction element based on the received range position signal during the select operation. The select operation control unit 100 performs a control such that, when the received range position signal indicates that the range position is switched from the D range or the R range (travelling range) to the N range during travelling, all of the friction elements that are in the engaged state in the D range or the R range are disengaged, and then, when the vehicle speed VSP decreases to a value lower than a predetermined vehicle speed, at least one friction element among a plurality of friction elements to be engaged when a predetermined gear position is to be shifted to is disengaged and the remaining friction elements are engaged.

The erroneous engagement diagnosis control unit 101 diagnoses the presence or absence of a friction element that is erroneously engaged during the select operation control. During travelling, when a range position signal for switching the range position from the D range or the R range to the N range is received, an instruction is made to disengage at least one friction element before all of the friction elements that are in the engaged state in the D range or the R range are disengaged. Further, a change in the rotation speed (hereinafter, referred to as a "rotation change") of the transmission input shaft after the disengagement is instructed is confirmed, and when there is no rotation change in the turbine rotation speed Nt (transmission input shaft rotation speed), it is diagnosed that the friction element instructed to be disengaged is in an erroneously engaged state in which the friction element cannot be disengaged.

Here, in the first embodiment, since the gear position is obtained by engaging three friction elements, when a D, R→N select operation is performed during travelling, an instruction is made to disengage one friction element before all of the three friction elements that are in the engaged state in the D range or the R range are disengaged, and thus an opportunity for an erroneous engagement diagnosis is created. Then, the change in the rotation speed of the transmission input shaft after the disengagement instruction to one friction element is output is confirmed, and when there is no change in the rotation speed of the turbine rotation speed Nt (transmission input shaft rotation speed), it is diagnosed that the one friction element to which the disengagement instruction is output is in an erroneously engaged state in which the friction element cannot be disengaged.

When the vehicle speed VSP becomes lower than a predetermined value in the N range in which all three friction elements which are in the engaged state in the D range or the R range are disengaged, the select operation control unit 100 remains, among the three friction elements to be engaged at a next D-range start or R-range start, one friction element in the disengaged state, and outputs an engagement instruction to the remaining two friction elements. In this way, by utilizing a state where two elements are engaged in the N range, the erroneous engagement diagnosis control unit 101 confirms the rotation change of the transmission input shaft or the transmission output shaft, and diagnoses, when there is a rotation change in the turbine rotation speed Nt (transmission input shaft rotation speed), that any of the friction elements in the disengaged state is in an erroneously engaged state in which the friction element cannot be disengaged.

Here, the erroneous engagement diagnosis control unit 101 confirms, by using the turbine rotation speed Nt from the turbine rotation sensor 13 and the transmission output shaft rotation speed No (=vehicle speed VSP) from the output shaft rotation sensor 14, the rotation change of the transmission input shaft or the transmission output shaft after a one-element disengagement instruction or a two-element engagement instruction. The presence or absence of the change in the rotation speed of the turbine rotation speed Nt (transmission input shaft rotation speed) is confirmed by monitoring whether a gear ratio operating point (Nt, No) related to the turbine rotation speed Nt and the transmission output shaft rotation speed No moves by an amount equal to or larger than a predetermined value on a two-dimensional coordinate plane (see FIG. 8 and FIG. 9).

During travelling, when the received range position signal indicates that the range position is switched from the D range or the R range (travelling range) to the N range, the torque limit control unit 102 outputs a command for limiting an output torque of the engine 1 (driving source for travelling) to the engine control module 11 via the CAN communication line 70. Here, the command for limiting the output torque of the engine 1 is a torque limit up to a torque corresponding to a creep torque (at engine idle rotation) for preventing acceleration even when there is an N advance or an N reverse caused by the erroneous engagement of disengagement elements. Further, the output of the torque limit command is continued until the diagnosis of erroneously engaged elements in the N range is completed.

[Configuration of Erroneous Engagement Diagnosis Process During Selection (FIG. 7)]

In step S1, after the process starts, it is determined whether there is a select operation from the D range to the N range or a select operation from the R range to the N range during travelling. In a case of YES (when there is a D→N operation or an R→N operation during travelling), the process proceeds to step S2, and in a case of NO (when there is no D→N operation or R→N operation during travelling), determination in step S1 is repeated.

In step S2, following the determination in S1 that there is a D→N operation or an R→N operation during travelling, a command for limiting the output torque of the engine 1 is output to the engine control module 11, and the process proceeds to step S3.

In step S3, following the torque limitation in S2, a disengagement instruction for disengaging one of the three elements engaged in the D range or the R range is output, the remaining two elements are remained in an engaged state as they are, and the process proceeds to step S4.

In step S4, following the one element disengagement in S3, it is determined whether there is a rotation change in a state where two elements are engaged. In a case of YES (with rotation change), the process proceeds to step S5, and in a case of NO (without rotation change), the process proceeds to step S6.

In step S5, following the determination in S4 that there is a rotation change, it is diagnosed that the disengagement elements and the clutch solenoids of the disengagement elements are normal, and the process proceeds to step S7.

In step S6, following the determination in S4 that there is no rotation change, it is diagnosed that the disengagement elements and the clutch solenoids of the disengagement elements are confirmed as in an erroneous engagement abnormal state, and the process proceeds to the end.

In step S7, following the diagnosis in S5 that the disengagement elements are normal, an instruction for disengaging all of the clutches is output to all of the three elements engaged in the D range or the R range, and the process proceeds to step S8.

In step S8, following the clutch all disengagement in S7, it is determined whether the vehicle speed VSP is a low vehicle speed equal to or less than a vehicle speed threshold value (for example, about 5 km/h) while the N range is selected. In a case of YES (being a low vehicle speed), the process proceeds to step S9, and in a case of NO (not being a low vehicle speed), the determination in step S8 is repeated.

In step S9, following the determination of being a low vehicle speed in S8, in preparation for a next D-range start or R-range start, an engagement instruction is output to two elements (B2, B3) that are common engagement elements in a D-range first-speed position and the R range, and the process proceeds to step S10.

In step S10, following the two-element engagement in S9, it is determined whether there is a rotation change in the state where two elements are engaged. In a case of YES (with rotation change), the process proceeds to step S11, and in a case of NO (without rotation change), the process proceeds to step S12.

In step S11, following the determination in S10 that there is a rotation change, it is diagnosed that any of disengagement elements other than the two engagement elements and the clutch solenoids of the disengagement elements are confirmed as in the erroneous engagement abnormal state, and the process proceeds to the end.

In step S12, following the determination in S10 that there is no rotation change, it is diagnosed that all of the disengagement elements other than the two engagement elements and the clutch solenoids of the disengagement elements are normal, the state where two elements are engaged in the N range is continued, and the process proceeds to the end.

Next, "Problems to be Solved and Solution to Problems" will be described. Further, an effect of the first embodiment will be described separately as "Operation of Erroneous Engagement Diagnosis During N Range Selection" and "Operation of Erroneous Engagement Diagnosis When Two Elements Are Engaged in N Range".

Problems to be Solved and Solution to Problems

As the automatic transmission in the background art, as disclosed in JP2002-323122A and the like, an automatic transmission is known in which a hydraulic control circuit is provided with a manual valve for switching oil paths in conjunction with a select operation. In a case of the automatic transmission of the background art, due to a hardware guarantee of the manual valve of which an automatic shift control in the D range and a select control of range positions (D, R, N) are separated, there is no need to deal with a shift solenoid function abnormality (erroneous engagement failure) that causes a change in a vehicle behavior.

However, in a case of a shift-by-wire automatic transmission in which a manual valve for switching oil paths according to a range position is eliminated, the control is performed on the shift solenoid provided for each of the friction elements on the gear train regardless of the range position. Therefore, the automatic shift control in the D range and the select control of the range positions (D, R, N) cannot be separated. That is, no hardware guarantee based on the manual valve is provided, and therefore, it is necessary to deal with the erroneous engagement failure that causes the change in the vehicle behavior among shift solenoid function abnormalities (erroneous engagement failure/erroneous disengagement failure).

On the other hand, in the case of the shift-by-wire automatic transmission, when a D→N select operation is performed during travelling, elements are brought into an all elements disengaged state, and two elements may be engaged (one element may be disengaged from a state where three elements are engaged in the D range) after the vehicle speed decreases. When there is a clutch or a brake in an erroneously engaged state in which the element cannot be disengaged in the all elements disengaged state, three elements including the friction element in the erroneously engaged state may be in an engaged state when two elements are engaged in an N range state, and a gear ratio may be established. There is a problem that when the gear ratio is established, even though a driver recognizes the N range state, a sudden deceleration caused by an engine brake occurs and the driver may feel uncomfortable.

Further, as a method for diagnosing the shift solenoid function abnormality, a method is known in which a self-diagnosis term for diagnosing a solenoid function abnormality or the like is set when an ignition ON signal is output while the vehicle is stopped, and a function abnormality of a plurality of shift solenoids is diagnosed in the self-diagnosis term. However, when the function abnormality of the shift solenoids is diagnosed by self-diagnosis, it is necessary to provide and manage a hydraulic sensor or the like in all oil paths from the plurality of shift solenoids to the friction elements. Further, since a diagnosis timing is limited to the self-diagnosis term, in a case where a contamination or the like is caught in spools of the shift solenoids during travelling outside the self-diagnosis term and erroneous engagement occurs, the method cannot solve the above-mentioned problems.

The present inventors have focused on the following points in response to the above-mentioned problems.

(a) In a case where a state is shifted from three-element engagement to two-element engagement, the gear train shifts to a neutral state normally when there is no erroneously engaged element, and a three-element engagement state occurs and a gear ratio is established in the gear train when there is an erroneously engaged element. By monitoring this difference, the presence or absence of the erroneously engaged element can be diagnosed.

(b) Regarding the diagnosis timing of the erroneously engaged element, when a D, R→N select operation is performed during travelling, a disengagement instruction is output to all of the engagement elements in the D range and the R range. Therefore, when a two-element engagement state is intentionally created before the disengagement instruction is output to all of the engagement elements, it is possible to obtain an opportunity to diagnose the presence or absence of the erroneously engaged element before the problems occur.

Based on the above-mentioned focused points, the following means to solve the problems is adopted. The stepped automatic transmission having gear positions includes the shifter control unit 18, the clutch solenoid 20, and the transmission control unit 10. The transmission control unit 10 includes the select operation control unit 100 that outputs an engagement instruction/a disengagement instruction to the friction element based on the received range position signal during the select operation, and the erroneous engagement diagnosis control unit 101 that diagnoses presence or absence of a friction element that is erroneously engaged during a select operation control. The select operation control unit 100 performs a control such that, when the received range position signal indicates that the range position is switched from the D range or the R range to the N range, all of the friction elements that are in the engaged state in the D range or the R range during travelling are disengaged; and then, when the vehicle speed VSP decreases to a value lower than a predetermined vehicle speed, at least one friction element among a plurality of friction elements to be engaged when a predetermined gear position is to be shifted to is disengaged and the remaining friction elements are engaged. The erroneous engagement diagnosis control unit 101 outputs a disengagement instruction to at least one friction element before all of the friction elements that are in the engaged state in the D range or the R range are disengaged, confirms a change in a rotation speed of a transmission input shaft after the disengagement instruction is output, and diagnoses, when there is no change in the rotation speed (the turbine rotation speed Nt), that the friction element instructed to be disengaged is in an erroneously engaged state in which the friction element cannot be disengaged.

That is, when the range is changed to the N range during travelling in the D range or the R range, not all of the engagement elements are simultaneously disengaged, but some of the friction elements are first instructed to be disengaged, and then the presence or absence of rotation change is confirmed. Further, when the friction elements instructed to be disengaged are normally disengaged, the gear train 3*a* shifts from a gear ratio established state to the neutral state, so that a rotation change of the turbine rotation speed Nt occurs, and it can be diagnosed that the disengagement elements are normal disengagement elements without erroneous engagement.

Meanwhile, when the friction element instructed to be disengaged remains the erroneously engaged state due to the function abnormality, the gear train 3*a* maintains the gear ratio established state, so that the rotation change of the turbine rotation speed Nt is limited to a vehicle speed change amount due to the gear ratio establishment. Therefore, there is no rotation change exceeding the vehicle speed change amount as the rotation change of the turbine rotation speed Nt, and it can be diagnosed that the disengagement element is erroneously engaged. That is, it can be diagnosed that there is an erroneously engaged disengagement element at a timing before all of the elements engaged in the D range or the R range are disengaged.

Therefore, when the vehicle speed VSP decreases in the N range state where a disengagement instruction is output to all of the elements, and then an engagement instruction is output to the remaining friction elements, the engagement state of the elements including the disengagement element in the erroneously engaged state and the establishment of the gear ratio are avoided. Further, occurrence of the sudden deceleration caused by the engine brake due to the establishment of the gear ratio even though the driver recognizes that the vehicle is in the N range state is prevented.

As a result, an uncomfortable feeling caused by erroneous engagement of the disengagement element can be prevented from giving to the driver in a case where all of the engagement elements are disengaged when the select operation to the N range is performed during travelling in the D range or the R range, and at least one element is disengaged and the remaining elements are engaged after the vehicle speed decreases.

[Operation of Erroneous Engagement Diagnosis During N Range Selection (FIG. 7 and FIG. 8)]

Figure 7:
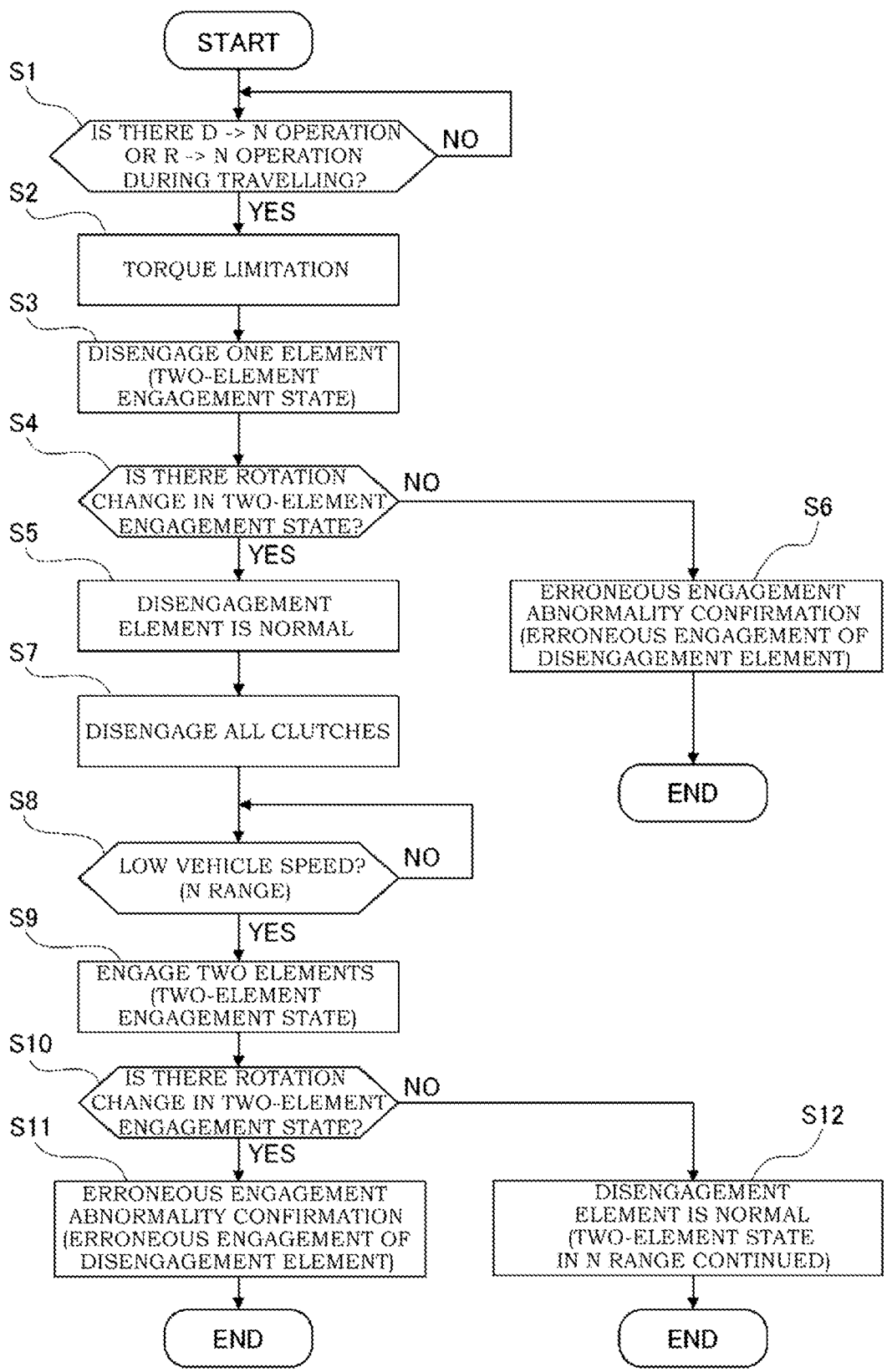
FIG. 7 is a flowchart showing a flow of an erroneous engagement diagnosis process during a selection which is executed by a select operation control unit, an erroneous engagement diagnosis control unit, and a torque limit control unit of the transmission control unit.

First, an operation of the erroneous engagement diagnosis process during N range selection will be described based on a flowchart of FIG. 7. During travelling, when a select operation from the D range to the N range or a select operation from the R range to the N range is performed, the process proceeds from S1 to S2, and in S2, a command for limiting the output torque of the engine 1 is output to the engine control module 11.

From S2, the process proceeds to S3→S4, and in S3, a disengagement instruction for disengaging one of the three elements engaged in the D range or the R range is output, and the remaining two elements are remained in the engaged state. In S4, it is determined whether there is a rotation change in the state where the two elements are engaged, and when it is determined that there is a rotation change, the process proceeds to S5. In S5, it is diagnosed that the disengagement elements and the clutch solenoids of the disengagement elements are normal.

Meanwhile, when it is determined in S4 that there is no rotation change, the process proceeds to S6, and in S6, it is diagnosed that the disengagement elements and the clutch solenoids of the disengagement elements are confirmed as in the erroneous engagement abnormal state, and the process proceeds to the end. When the process proceeds to the end, for example, a warning is issued based on the erroneous engagement abnormality diagnosis, so as to notify the driver of the abnormality. Further, a gear position, in which a disengagement element which is confirmed as having an erroneous engagement abnormality is an engagement element, is selected, and a limp home control for ensuring travelling to a dealer or the like is performed.

In a case where the disengagement instruction for disengaging one of the three elements engaged in the D range or the R range is output in S3, when the one element is normally disengaged according to the output of the disengagement instruction, the gear train 3*a* of the automatic transmission 3 is in a neutral state in which transmission of a driving force or a braking force is cut off by the disengagement element. Therefore, as shown by an arrow A in FIG. 8, the gear ratio operating point (Nt, No) in the D range or the R range undergoes a rotation change, in which the turbine rotation speed Nt decreases to the normal region, exceeding the vehicle speed change amount (=a change amount in a transmission output shaft rotation speed No). Therefore, when it is determined that there is a rotation change, it can be diagnosed that the disengagement element and the clutch solenoid of the disengagement elements are normal.

Figure 8:
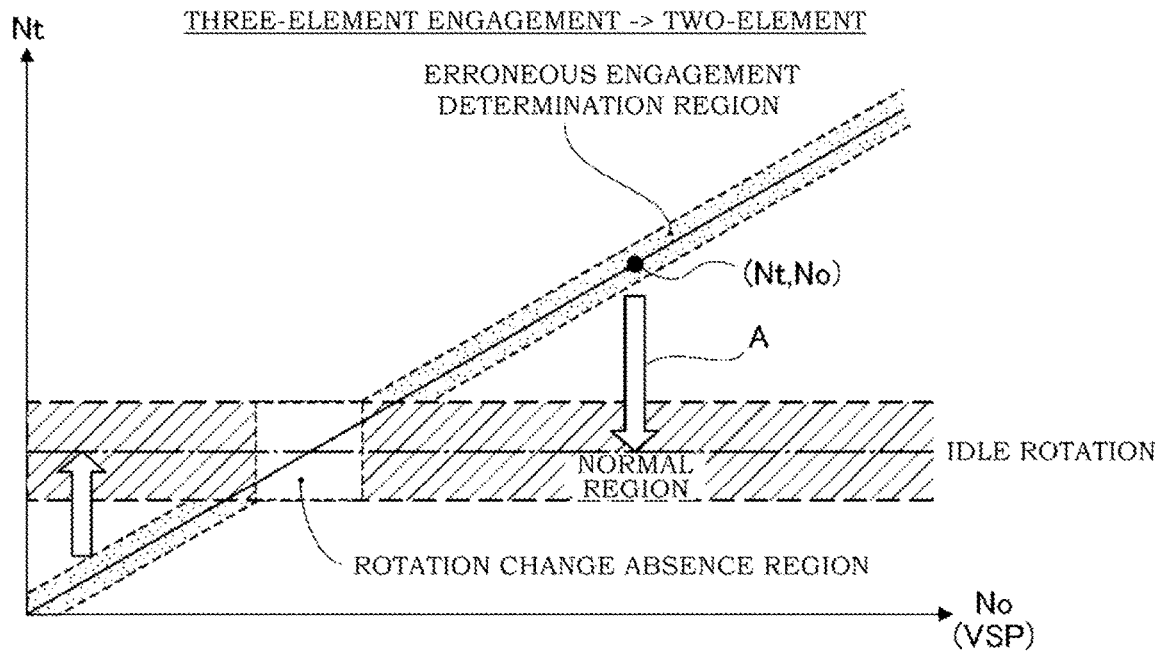
FIG. 8 is an erroneous engagement diagnosis diagram showing a normal region, an erroneous engagement determination region, and a rotation change absence region diagnosed according to a relation between a transmission output shaft rotation speed and a turbine rotation speed when a state is shifted from a three-element engagement state to a two-element engagement state by performing a D→N select operation or a R→N select operation.
Figure 9:
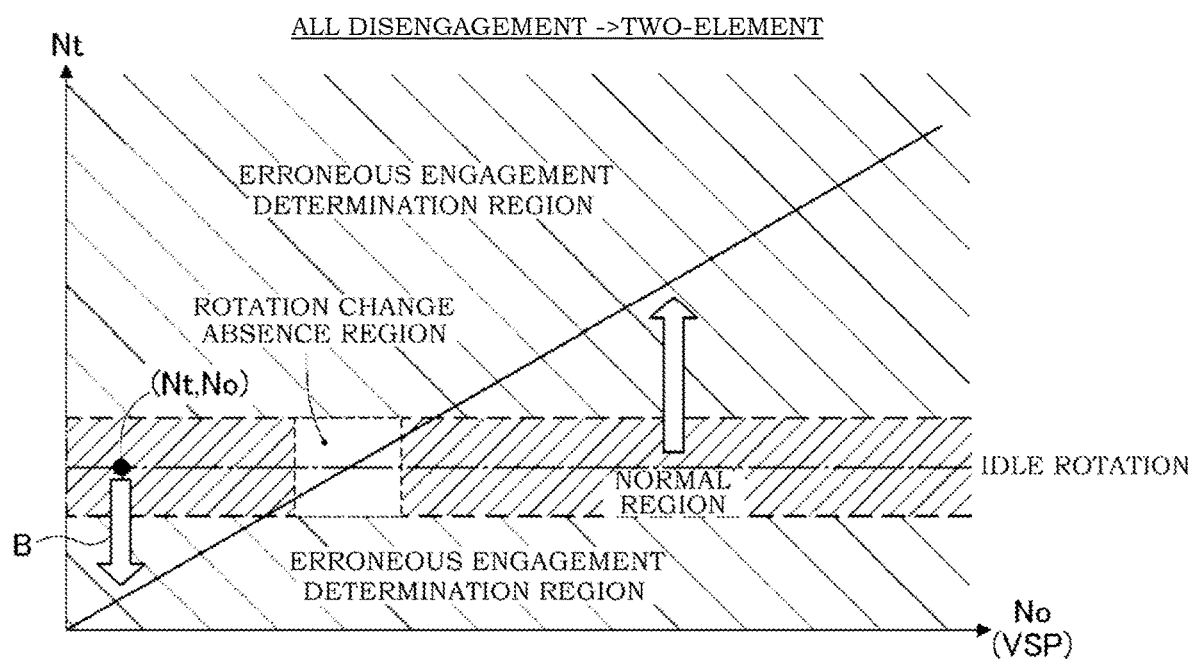
FIG. 9 is an erroneous engagement diagnosis diagram showing a normal region, an erroneous engagement determination region, and a rotation change absence region which are diagnosed based on a relation between the transmission output shaft rotation speed and the turbine rotation speed in a case where a state is shifted from an all disengagement state to a two-element engagement state due to a vehicle speed decrease in an N range.

Meanwhile, in a case where the one of the three elements engaged in the D range or the R range is not brought into the disengaged state in S3 and is erroneously engaged regardless of the output of the disengagement instruction for disengaging the element, the gear train 3a of the automatic transmission 3 remains in the gear position of the three elements engaged in the D range or the R range, and the gear ratio is established. Therefore, the gear ratio operating point (Nt, No) in the D range or the R range remains in the erroneous engagement determination region in which the gear ratio shown in FIG. 8 is maintained, there is no rotation change in the turbine rotation speed Nt that exceeds the vehicle speed change amount, and the gear ratio operating point (Nt, No) does not deviate from the erroneous engagement determination region. Therefore, when it is determined that there is no rotation change, it can be diagnosed that the disengagement element and the clutch solenoid of the disengagement elements have a function abnormality.

Then, only when it is diagnosed in S5 that the disengagement elements and the clutch solenoids of the disengagement elements are normal, the process proceeds to the next S7, and in S7, the instruction for disengaging all of the clutches is output to all of the three elements engaged in the D range or the R range.

In this way, when a D→N select operation or an R→N select operation is performed during travelling, a two-element engagement instruction state is created in S3 before S6 of outputting a disengagement instruction to all of the engagement elements. Therefore, the presence or absence of a disengagement element that is erroneously engaged can be diagnosed at the timing before all of the elements engaged in the D range or the R range are disengaged (S4 to S6). Then, it is prevented that the process proceeds to S9 and the engagement instruction is output to the two elements even though the disengagement elements are erroneously engaged, and the sudden deceleration caused by the establishment of the gear ratio can be prevented in advance.

In the first embodiment, the disengagement instruction is output to one friction element before all of the friction elements that are in the engaged state in the D range or the R range are disengaged, then the change in the rotation speed of the transmission input shaft is confirmed, and when there is no rotation change in the turbine rotation speed Nt, it is diagnosed that the one friction element to which the disengagement instruction is output is in an erroneously engaged state in which the friction element cannot be disengaged. Therefore, the one friction element to which the disengagement instruction is output can be specified as an erroneously engaged disengagement element that cannot be disengaged. For example, the third clutch K3 is assumed to be one friction element to which the disengagement instruction is to be output, when a D-range first-speed→N range select operation is performed. In this case, when the third clutch K3 is specified as the erroneously engaged disengagement element, it can be verified, according to an oil pressure detection value from the third clutch hydraulic sensor 15, that the third clutch K3 is an erroneously engaged disengagement element. In addition, the first brake B1 is assumed to be one friction element to which the disengagement instruction is output, when an R range→N range select operation is performed. In this case, when the first brake B1 is specified as the erroneously engaged disengagement element, it can be verified, according to a rotation speed detection value (=0) from the intermediate shaft rotation sensor 19, that the first brake B1 is an erroneously engaged disengagement element.

[Operation of Erroneous Engagement Diagnosis When Two Elements Are Engaged in N Range (FIG. 7 and FIG. 9)]

Next, an operation of the erroneous engagement diagnosis process when two elements are engaged in the N range will be described based on the flowchart of FIG. 7. When the process proceeds to S8 from S7 in which the instruction for disengaging all of the clutches is output to all of the three elements engaged in the D range or the R range, in S8, it is determined whether the vehicle speed VSP is a low vehicle speed equal to or less than a vehicle speed threshold value while the N range is selected.

When it is determined in S8 that the vehicle speed VSP is the low vehicle speed, the process proceeds to S9→S10. In S9, in preparation for the next D-range start or R-range start, the engagement instruction is output to two elements (B2, B3) that are common engagement elements in the D-range first-speed position and the R range. In S10, it is determined whether there is a rotation change in the state where two elements are engaged, and when it is determined in S10 that there is no rotation change, the process proceeds to S12. In S12, it is diagnosed that all of the disengagement elements other than the two engagement elements and the clutch solenoids of the disengagement elements are normal, and then the state where two elements are engaged in the N range is continued, and the process proceeds to the end.

Meanwhile, when it is determined in S10 that there is a rotation change, the process proceeds to S11, and in S11, following the determination in S10 that there is a rotation change, it is diagnosed that any of disengagement elements other than the two engagement elements and the clutch solenoids of the disengagement elements are confirmed as in the erroneous engagement abnormal state, and the process proceeds to the end. When the process proceeds to the end, for example, a warning is issued based on the erroneous engagement abnormality diagnosis to notify the driver of the abnormality. Further, based on the gear position in which the disengagement element which is confirmed as having an erroneous engagement abnormality is the engagement element, the limp home control for ensuring travelling to the dealer or the like is performed.

Here, in a case where an engagement instruction is output to two elements among all of the elements disengaged in the N range, when only two elements are normally engaged according to the output of the two-element engagement instruction, the gear train 3a maintains the neutral state. Therefore, the gear ratio operating point (Nt, No) in the N range remain in the normal region of an idle rotation region in FIG. 9, and the turbine rotation speed Nt does not exceed an idle rotation fluctuation amount and does not deviate from the normal region. Therefore, when it is determined that there is no rotation change, it can be diagnosed that the disengagement element and the clutch solenoid of the disengagement elements are normal.

Meanwhile, in the case where the engagement instruction is output to two elements among all of the elements disengaged in the N range, when there is an erroneously engaged element and three elements including the erroneously engaged element are brought into the engaged state, the gear ratio of the gear train 3a is established due to the three-element engagement. Therefore, as shown by an arrow B in FIG. 9, the gear ratio operating point (Nt, No) undergoes a rotation change in which the turbine rotation speed Nt decreases beyond the normal region. Therefore, when it is determined that there is a rotation change, it can be diagnosed that the disengagement element and the clutch solenoid of the disengagement elements have a function abnormality.

In this way, when a D→N select operation or an R→N select operation is performed during travelling, the vehicle is in a low vehicle speed state and the engagement instruction is output to two elements among all of the elements disengaged in the N range, the two-element engagement instruction state is created in S9. Therefore, the presence or absence of an erroneously engaged disengagement element can be diagnosed by utilizing the timing when the vehicle is in a low vehicle speed state and the engagement instruction is output to two elements among all of the elements disengaged in the N range (S10-S12).

In the first embodiment, when the vehicle speed VSP decreases to a value lower than a predetermined vehicle speed after all of the friction elements that are in the engaged state in the D range or the R range are disengaged, one friction element among a plurality of friction elements to be engaged at a next start is remained in the disengaged state, and an engagement instruction is output to the remaining friction elements. Therefore, at the next start after the range position is switched from the N range to the D range or the R range, a start gear position can be established just by outputting the engagement instruction to the only one friction element, and start responsiveness can be ensured. In particular, when the engagement instruction is output to the two elements (B2, B3) that are common engagement elements in the D-range first-speed position and the R range, start responsiveness of both a forward start and a reverse start can be ensured.

In the first embodiment, after the one friction element among the plurality of friction elements to be engaged at the next start is remained in the disengaged state and the engagement instruction is output to the remaining friction elements, the rotation change of the transmission input shaft or the transmission output shaft is confirmed. Further, when there is a rotation change of the turbine rotation speed Nt, any of the friction elements in the disengaged state is diagnosed as in an erroneously engaged state in which the friction element cannot be disengaged. Therefore, while the start responsiveness when the range position is switched to the D range or the R range can be ensured, the erroneously engaged disengagement element can be diagnosed by utilizing creation of the two-element engagement state in the N range.

In the first embodiment, when the received range position signal indicates that the range position is switched from the D range or the R range to the N range during travelling, a command for limiting the output torque of the engine 1 is output in S2. For example, when the gear ratio operating point (Nt, No) is in the rotation change absence region, the disengagement element may be determined as normal even though the disengagement element has an erroneous engagement abnormality. In this case, an N range forward movement or an N range reverse movement may occur due to the establishment of the gear ratio in the state where the two elements are engaged in S9. In this regards, by limiting the output torque of the engine 1 in advance when a select operation to the N range is performed, an acceleration start due to an N range forward movement or an N range reverse movement when a two-element engagement instruction is output in the N range state can be prevented in advance.

As described above, a diagnostic device of the automatic transmission 3 of the first embodiment has the effects listed below.

(1) A diagnostic device for an automatic transmission to be used in the stepped automatic transmission 3 having gear positions, includes:

a range position determination unit (the shifter control unit 18) configured to determine a range position based on a select operation of a driver, a shift solenoid (the clutch solenoid 20) configured to control engagement/disengagement of each of a plurality of friction elements B1, B2, B3, K1, K2, and K3 of the gear train 3a, and the transmission control unit 10 configured to receive the range position signal transmitted from the range position determination unit and output a control instruction to the shift solenoid.

The transmission control unit 10 includes a select operation control unit 100 configured to output an engagement instruction/a disengagement instruction to a friction element based on the received range position signal during a select operation, and an erroneous engagement diagnosis control unit 101 configured to diagnose presence or absence of a friction element that is erroneously engaged during a control performed by the select operation control unit 100.

The select operation control unit 100 is configured to perform a control such that, when the received range position signal indicates that the range position is switched from a travelling range (the D range or the R range) to a neutral range (the N range) during travelling, all of friction elements that are in an engaged state in the travelling range are disengaged, and then, when a vehicle speed VSP decreases to a value lower than a predetermined vehicle speed, at least one friction element among a plurality of friction elements to be engaged when a predetermined gear position is to be shifted to is disengaged and the remaining friction elements are engaged.

The erroneous engagement diagnosis control unit 101 is configured to output a disengagement instruction to at least one friction element before all of the friction elements that are in the engaged state in the travelling range are disengaged, confirm a change in a rotation speed of a transmission input shaft after the disengagement instruction is output, and diagnose, when there is no change in the rotation speed (the turbine rotation speed Nt), that the friction element instructed to be disengaged is in an erroneously engaged state in which the friction element is not able to be disengaged.

Therefore, when the select operation to the neutral range (the N range) is performed during travelling, an uncomfortable feeling caused by erroneous engagement of the disengagement element can be prevented from being given to a driver in a case where all of the engagement elements are disengaged, and at least one element is disengaged and the remaining elements are engaged after the vehicle speed decreases.

(2) The erroneous engagement diagnosis control unit 101 is configured to confirm the change in the rotation speed of the transmission input shaft after the disengagement instruction is output to the one friction element before all of the friction elements that are in the engaged state in the travelling range (the D range or the R range) are disengaged, and diagnose, when there is no change in the rotation speed (the turbine rotation speed Nt), that the one friction element to which the disengagement instruction is output is in an erroneously engaged state in which the friction element is not able to be disengaged.

Therefore, when it is diagnosed that the friction element is in the erroneously engaged state, the one friction element to which the disengagement instruction is output can be specified as an erroneously engaged disengagement element that cannot be disengaged.

(3) The select operation control unit 100 is configured to, when the vehicle speed VSP decreases to a value lower than the predetermined vehicle speed after all of the friction elements that are in the engaged state in the travelling range (the D range or the R range) are disengaged, remain one friction element among a plurality of friction elements to be engaged at a next start in the disengaged state and output an engagement instruction to the remaining friction elements.

Therefore, at the next start after the range position is switched to the travelling range (the D range or the R range), a start gear position can be established just by outputting the engagement instruction to the only one friction element, and start responsiveness can be ensured.

(4) The erroneous engagement diagnosis control unit 101 is configured to confirm, after the one friction element among the plurality of friction elements to be engaged at the next start is remained in the disengaged state and the engagement instruction is output to the remaining friction elements, the rotation change of the transmission input shaft or the transmission output shaft, and diagnose, when there is a change in the rotation speed (the turbine rotation speed Nt), that any of the friction elements in the disengaged state is in an erroneously engaged state in which the friction element is not able to be disengaged.

Therefore, while the start responsiveness can be ensured when the range position is switched to the travelling range (the D range or the R range), the erroneous engaged disengagement element can be diagnosed by utilizing creation of an element engagement state (the two-element engagement state) in which the erroneous engagement diagnosis is possible in the neutral range (the N range).

(5) The transmission control unit 10 includes a torque limit control unit 102 configured to output, when the received range position signal indicates that the range position is switched from the travelling range (the D range or the R range) to the neutral range (the N range) during travelling, a command for limiting an output torque of a driving source for travelling (the engine 1) until the erroneous engagement diagnosis in the neutral range (the N range) is completed.

Therefore, in a case where the disengagement element is determined as normal even though the disengagement element has an erroneous engagement abnormality, an acceleration start due to an N range forward movement or an N range reverse movement when there is an engagement instruction of the friction element in the neutral range state (the N range state) can be prevented in advance.

The diagnostic device for an automatic transmission of the invention has been described above based on the first embodiment. However, a specific configuration is not limited to the first embodiment, and design changes and additions are allowed as long as the configuration does not depart from a gist of an invention according to each claim in the scope of claims.

In the first embodiment, an example is shown in which the disengagement instruction is output to the one friction element before all of the friction elements that are in the engaged state in the travelling range are disengaged, then the change in the rotation speed of the transmission input shaft is confirmed, and when a normal state in which there is no erroneously engaged element is determined, all of the friction elements are disengaged. Further, when the vehicle speed decreases to a value lower than a predetermined vehicle speed after all of the friction elements are disengaged, one friction element among three friction elements to be engaged at a next start is remained in the disengaged state, and an engagement instruction is output to the remaining friction elements. However, in a case where an erroneously engaged element is specified by the disengagement instruction to the one friction element, when the vehicle speed decreases to the value lower than the predetermined vehicle speed, the presence or absence of the erroneously engaged element after the vehicle speed decreases may be diagnosed by outputting an engagement instruction to two friction elements including the erroneously engaged element. In this case, when one erroneously engaged element is specified, it is possible to diagnose the presence or absence of the erroneously engaged element after the vehicle speed decreases, while preventing an uncomfortable feeling caused by an engine brake state from being given to the driver. In addition, the first embodiment shows an example in which the disengagement instruction is output to one friction element before all of the friction elements that are in the engaged state in the travelling range are disengaged, and then the rotation change of the transmission input shaft or the transmission output shaft is confirmed. However, regarding the rotation change, at least the change in the rotation speed of the transmission input shaft may be confirmed.

The first embodiment shows, as an automatic transmission, the automatic transmission 3 that achieves nine forward speeds and one reverse speed by engagement of three friction elements. However, the automatic transmission may be one that includes a plurality of forward positions and reverse positions by engaging two friction elements, or one that includes a plurality of forward positions and reverse positions by engaging four friction elements.

The first embodiment shows, as an automatic transmission, the automatic transmission 3 having nine forward speeds and one reverse speed. However, the automatic transmission may be a stepped automatic transmission having a gear position other than those of the nine forward speeds and one reverse speed, or a continuously variable transmission with a sub-transmission in which a belt continuously variable transmission and a multi-stage transmission are combined.

The first embodiment shows a diagnostic device of the automatic transmission 3 to be mounted on an engine vehicle. However, the diagnostic device can be applied not only to the engine vehicle but also as a diagnostic device for an automatic transmission of such as a hybrid vehicle and an electric vehicle.

The present application claims a priority of Japanese Patent Application No. 2019-126768 filed with the Japan Patent Office on Jul. 8, 2019, all the contents of which are hereby incorporated by reference.

The invention claimed is:

1. A diagnostic device for an automatic transmission to be used in a stepped automatic transmission having gear positions, the diagnostic device comprising:
   a range position determinator configured to determine a range position based on a select operation of a driver;
   a shift solenoid configured to control engagement/disengagement of each of a plurality of friction elements of a gear train; and
   a transmission controller configured to receive a range position signal transmitted from the range position determinator and output a control instruction to the shift solenoid, wherein
   the transmission controller is further configured to:
   output an engagement instruction/a disengagement instruction to a friction element based on the received range position signal during the select operation,
   when the received range position signal indicates that the range position is switched from a travelling range to a neutral range during travelling, output the disengagement instruction to all of friction elements that are in an engaged state in the travelling range,
   output the disengagement instruction to at least one friction element before the disengagement instruction is output to all of the friction elements that are in the engaged state in the travelling range, confirm a change in a rotation speed of a transmission input shaft after the disengagement instruction is output to the at least one friction element, and when there is no change in the rotation speed, diagnose that any of the friction elements instructed to be disengaged is in an erroneously engaged state in which the any of the friction elements is not able to be disengaged.

2. The diagnostic device for the automatic transmission according to claim 1, wherein the transmission controller is further configured to:

output the disengagement instruction to one friction element before the disengagement instruction is output to all of the friction elements that are in the engaged state in the travelling range, confirm the change in the rotation speed of the transmission input shaft after the disengagement instruction is output to the one friction element, and when there is no change in the rotation speed, diagnose that the one friction element instructed to be disengaged is in the erroneously engaged state in which the one friction element is not able to be disengaged.

3. The diagnostic device for the automatic transmission according to claim 1, wherein the transmission controller is further configured to:

when the received range position signal indicates that the range position is switched from the travelling range to the neutral range during travelling, output the disengagement instruction to all of the friction elements that are in the engaged state in the travelling range, and then, when a vehicle speed decreases to a value lower than a predetermined vehicle speed, output the disengagement instruction to the at least one friction element among a plurality of friction elements to be engaged when a predetermined gear position is to be shifted to and output the engagement instruction to the remaining friction elements, and while the disengagement instruction is output to the at least one friction element among the plurality of friction elements to be engaged and after the engagement instruction is output to the remaining friction elements, confirm the change in the rotation speed of the transmission input shaft, and when there is the change in the rotation speed, diagnose that the any of the friction elements instructed to be disengaged is in the erroneously engaged state in which the any of the friction elements is not able to be disengaged.

4. The diagnostic device for the automatic transmission according to claim 3, wherein the transmission controller is further configured to:

when the vehicle speed decreases to the value lower than the predetermined vehicle speed after the disengagement instruction is output to all of the friction elements that are in the engaged state in the travelling range, while the disengagement instruction is output to one friction element and after the engagement instruction is output to the remaining friction elements, confirm the change in the rotation speed of the transmission input shaft, and when there is the change in the rotation speed, diagnose that the one friction element instructed to be disengaged is in the erroneously engaged state in which the one friction element is not able to be disengaged.

5. The diagnostic device for the automatic transmission according to claim 3, wherein the transmission controller is further configured to:

when the vehicle speed decreases to the value lower than the predetermined vehicle speed after the disengagement instruction is output to all of the friction elements that are in the engaged state in the travelling range, while the disengagement instruction is output to one friction element among a plurality of friction elements to be engaged at a next start of the vehicle, output the engagement instruction to the remaining friction elements.

6. The diagnostic device for the automatic transmission according to claim 1, wherein the transmission controller is further configured to:

when the received range position signal indicates that the range position is switched from the travelling range to the neutral range during travelling, output a command for limiting an output torque of a driving source for travelling until an erroneous engagement diagnosis in the neutral range is completed.

7. A diagnostic device for an automatic transmission to be used in a stepped automatic transmission having gear positions, the diagnostic device comprising:

a range position determinator configured to determine a range position based on a select operation of a driver;

a shift solenoid configured to control engagement/disengagement of each of a plurality of friction elements of a gear train; and a transmission controller configured to receive a range position signal transmitted from the range position determinator and output a control instruction to the shift solenoid, wherein the transmission controller is further configured to:

output an engagement instruction/a disengagement instruction to a friction element based on the received range position signal during the select operation, when the received range position signal indicates that the range position is switched from a travelling range to a neutral range during travelling, output the disengagement instruction to all of friction elements that are in an engaged state in the travelling range, and then, when a vehicle speed decreases to a value lower than a predetermined vehicle speed, output the disengagement instruction to at least one friction element among a plurality of friction elements to be engaged when a predetermined gear position is to be shifted to and output the engagement instruction to the remaining friction elements, while the disengagement instruction is output to the at least one friction element and after the engagement instruction is output to the remaining friction elements, confirm a change in a rotation speed of a transmission input shaft, and when there is the change in the rotation speed, diagnose that any of the friction elements instructed to be disengaged is in an erroneously engaged state in which the any of the friction elements is not able to be disengaged.

8. A control device for an automatic transmission to be used in a stepped automatic transmission having gear positions, the control device comprising:

a shift solenoid configured to control engagement/disengagement of each of a plurality of friction elements, wherein the control device is configured to:

when a range position is switched from a travelling range to a neutral range during travelling, output a disengagement instruction to all of friction elements that are in an engaged state in the travelling range, output the disengagement instruction to at least one friction element before the disengagement instruction is output to all of the friction elements that are in the engaged state in the travelling range, confirm a change in a rotation speed of a transmission input shaft after the disengagement instruction is output to the at least one friction element, and issue a warning when there is no change in the rotation speed.

9. A control device for an automatic transmission to be used in a stepped automatic transmission having gear positions, the control device comprising:

a shift solenoid configured to control engagement/disengagement of each of a plurality of friction elements, wherein the control device is configured to:

when a range position is switched from a travelling range to a neutral range during travelling, output a disengagement instruction to all of friction elements that are in an engaged state in the travelling range, and then, when a vehicle speed decreases to a value lower than a predetermined vehicle speed, output the disengagement instruction to at least one friction element among a plurality of friction elements to be engaged when a predetermined gear position is to be shifted to and output an engagement instruction to the remaining friction elements, while the disengagement instruction is output to the at least one friction element and after the engagement instruction is output to the remaining friction elements, confirm a change in a rotation speed of a transmission input shaft, and issue a warning when there is no change in the rotation speed.

* * * * *